(12) United States Patent  (10) Patent No.: US 8,693,057 B2
Harayama  (45) Date of Patent: Apr. 8, 2014

(54) QUANTIZATION USING DITHER MATRIX NOISE BASED ON NOISE USE RATE AND ACCUMULATED ERROR BASED ON ERROR USE RATE

(75) Inventor: Kenji Harayama, Nagano (JP)

(73) Assignee: Mimaki Engineering Co., Ltd., Nagano (JP)

( * ) Notice: Subject to any disclaimer, the term of this patent is extended or adjusted under 35 U.S.C. 154(b) by 185 days.

(21) Appl. No.: 13/498,328

(22) PCT Filed: Sep. 28, 2009

(86) PCT No.: PCT/JP2009/004934
§ 371 (c)(1),
(2), (4) Date: Mar. 27, 2012

(87) PCT Pub. No.: WO2011/036735
PCT Pub. Date: Mar. 31, 2011

(65) Prior Publication Data
US 2012/0182586 A1  Jul. 19, 2012

(51) Int. Cl.
*H04N 1/405* (2006.01)
(52) U.S. Cl.
CPC ........... *H04N 1/4051* (2013.01); *H04N 1/4052* (2013.01)
USPC ........................................ 358/3.05; 358/3.14
(58) Field of Classification Search
None
See application file for complete search history.

(56) References Cited

U.S. PATENT DOCUMENTS

| 6,700,680 | B2 * | 3/2004 | Toyoda et al. | ............... 358/3.03 |
| 7,151,619 | B2 * | 12/2006 | Toyoda et al. | ............... 358/3.13 |
| 7,203,376 | B2 * | 4/2007 | Takahashi et al. | ............ 382/252 |
| 8,326,032 | B2 * | 12/2012 | Yamaguchi et al. | .......... 382/162 |

FOREIGN PATENT DOCUMENTS

| JP | 2006-240054 | 9/2006 |
| JP | 2008-087382 | 4/2008 |

\* cited by examiner

*Primary Examiner* — Scott A Rogers
(74) *Attorney, Agent, or Firm* — Jianq Chyun IP Office

(57) ABSTRACT

A computer-readble medium stored with a program causing a computer to quantize a gray level causes the computer to perform a pixel selecting process; determining a noise use rate indicating the degree to which a dither matrix noise has an influence on the quantization and an error use rate indicating the degree to which an accumulated error has an influence on the quantization and determining the noise use rate and the error use rate corresponding to the corresponding pixel depending on the gray levels of the pixels sequentially selected in the pixel selecting process; and performing the quantization on the gray levels of the pixels sequentially selected in the pixel selecting process and performing the quantization using the dither matrix noise based on the noise use rate corresponding to the corresponding pixel and using the accumulated error based on the error use rate corresponding to the corresponding pixel.

9 Claims, 10 Drawing Sheets

(a)
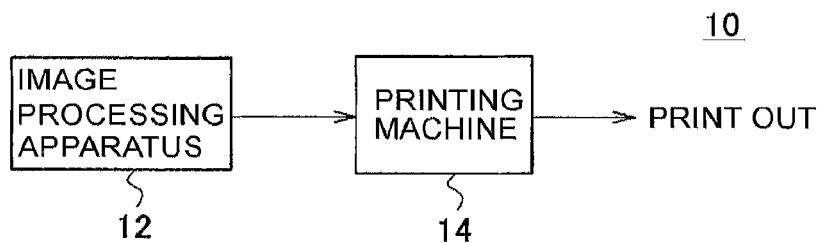
(b)
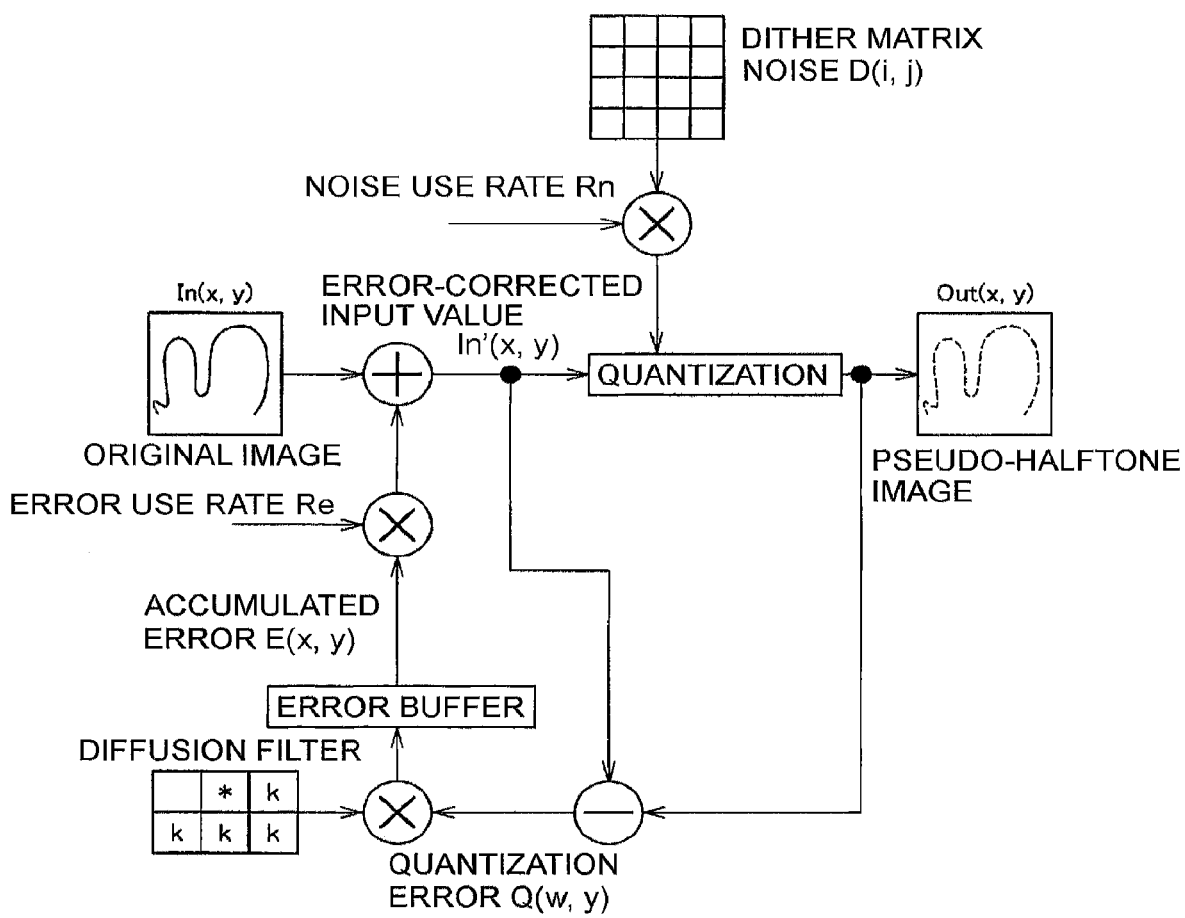
FIG. 1

(a)
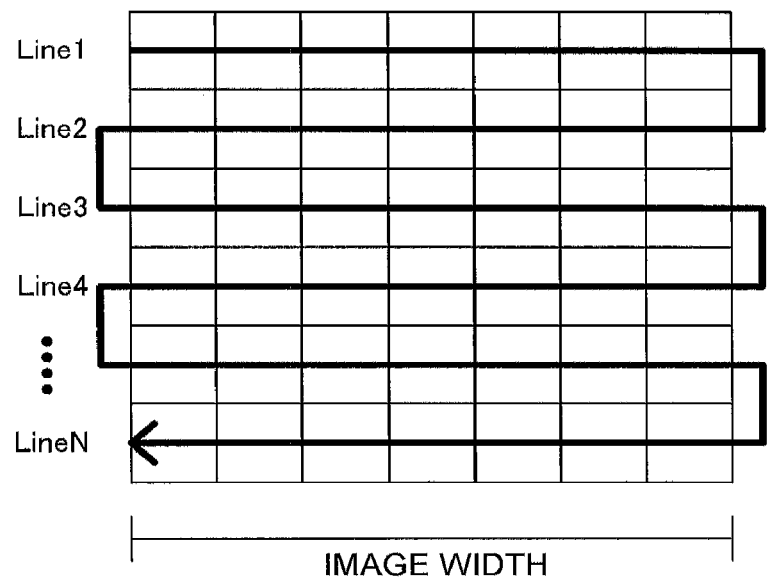
IMAGE WIDTH
(b)
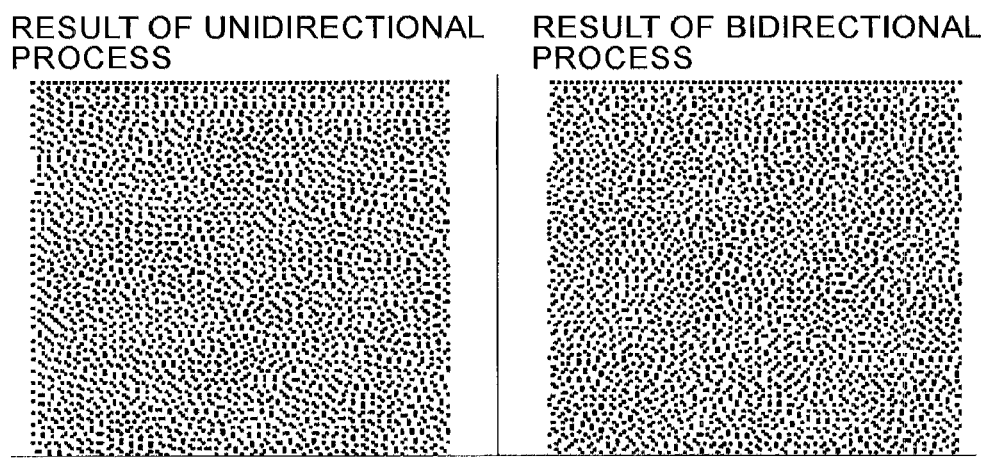
FIG. 3

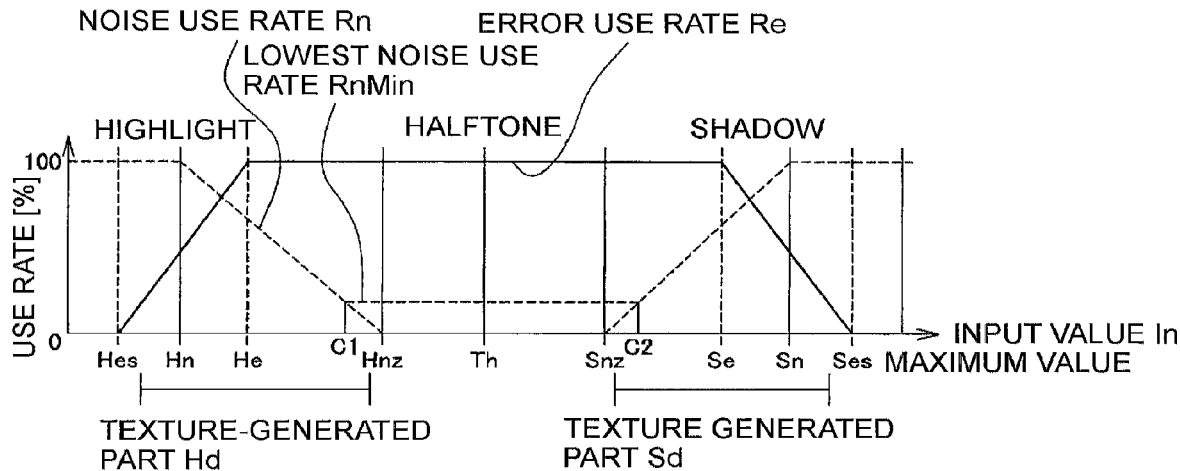

$$Re = \begin{cases} 0 & \text{(HIGHLIGHTED PART: } In \leq Hes) \\ (In - Hes)/(He - Hes) & \text{(FROM HIGHLIGHTED PART TO HALFTONE PART: } Hes < In < He) \\ 1 & \text{(HALFTONE PART: } He \leq In \leq Se) \\ (Ses - In)/(Ses - Se) & \text{(FROM SHADOWED PART TO HALFTONE PART: } Se < In < Ses) \\ 0 & \text{(SHADOWED PART: } Ses \leq In) \end{cases}$$

$$Rn = \begin{cases} 1 & \text{(HIGHLIGHTED PART: } In \leq Hn) \\ (Hnz - In)/(Hnz - Hn) & \text{(FROM HIGHLIGHTED PART TO HALFTONE PART: } Hn < In < C1) \\ RnMin & \text{(HALFTONE PART: } C1 \leq In \leq C2) \\ (In - Snz)/(Sn - Snz) & \text{(FROM SHADOWED PART TO HALFTONE PART: } C2 < In < Sn) \\ 1 & \text{(SHADOWED PART: } Sn \leq In) \end{cases}$$

Re: ERROR USE RATE
Rn: NOISE USE RATE
In: INPUT VALUE

FIG. 4

QUANTIZATION USING DITHER MATRIX NOISE BASED ON NOISE USE RATE AND ACCUMULATED ERROR BASED ON ERROR USE RATE

CROSS-REFERENCE TO RELATED APPLICATION

This application is a 371 of international application of PCT application serial no. PCT/JP2009/004934, filed on Sep. 28, 2009. The entirety of the above-mentioned patent application is hereby incorporated by reference herein and made a part of this specification.

TECHNICAL FIELD

The present invention relates to a program, an image processing apparatus, and an image processing method.

BACKGROUND ART

In order to print an image with a printer, it is typically necessary to perform a quantization process on the image. The quantization process is a halftone process of converting an image expressed with a continuous tone into a gradation which can be expressed by the printer. For example, a dither process or an error diffusion process has been known as a method of performing the quantization process.

A method of performing the quantization process selectively using the dither process and the error diffusion process has been known (for example, see Japan Laid Open Publications JP-A-2006-240054 and JP-A-2008-87382). For example, in the method disclosed in Japan Laid Open Publications JP-A-2006-240054, the dither process and the error diffusion process are separately used depending on the gray level ranges. In the method disclosed in Japan Laid Open Publications JP-A-2008-87382, the dither process and the error diffusion process are separately used depending on dot sizes by the use of a print head which can form N types of dots having different sizes.

DISCLOSURE OF INVENTION

Problems to be Solved by the Invention

The dither process is a method of determining the presence of a halftone dot by applying the value (noise) of a dither matrix to pixel data, in which an original image is paneled with a dither matrix to perform the quantization process. Accordingly, there may be a problem of texture that a specific pattern formed in the matrix is repeated. As a result, the image quality may degrade.

For example, to prevent the generation of texture specific to the dither process, adjusting the value (noise) of the dither matrix to an appropriate value can be considered. However, the method suppressing the generation of texture by this adjustment requires a large amount of operation time and thus is not good in practice.

On the other hand, the error diffusion process is a method of preparing a threshold value to be compared with pixel data, comparing the value of pixel data corrected by the use of a previously-calculated accumulated error with the threshold value, and determining the presence of a halftone dot depending on the comparison result. When the error diffusion process is used, the error generated by the quantization can be reduced over the entire image and thus the texture which is generated by the dither process is not generated.

However, when the error diffusion process is used, problems such as a dot delay where the arrangement of dots is delayed in the print result of a highlighted part or shadowed part, a worm noise where dots are connected, and a pattern noise where the dots in a halftone part are partially arranged in a checkered pattern or randomly may be caused. As a result, the image quality may degrade by image shift due to the dot delay, generation of a streak pattern due to the worm noise, or the like.

For example, when the dither process and the error diffusion process are separately used as in Japan Laid Open Publication JP-A-2006-240054, a boundary line due to the difference between quantization methods may be formed in a part where the dither process is switched to the error diffusion process, thereby degrading the image quality. When the method disclosed in Japan Laid Open Publication JP-A-2008-87382 is used, for example, the error diffusion process is used in a highlighted part and the dot delay is thus generated to cause the degradation of the image quality.

Accordingly, there is a need for performing the quantization process by the use of a more appropriate method. More specifically, there is a need for a quantization process which can suppress, for example, the texture, the dot delay, the worm noise, and the pattern noise to realize a high-image-quality halftone process. Therefore, an object of the invention is to provide a program, an image processing apparatus, and an image processing method which can solve the above-mentioned problems.

Means for Solving the Problems

As a result of eager study, the inventor of the present invention paid attention to the fact that the generability of texture varies depending on the gray levels of pixels in the dither process. Attention is paid to the fact that the generability of the dot delay or worm noise also varies depending on the gray levels of pixels in the error diffusion process. The inventor found that it is possible to appropriately perform the quantization process while suppressing the generation of texture, dot delay, and worm noise, for example, by distributing the influences of the dither process and the error diffusion process without switching the dither process and the error diffusion process and performing any one process. The invention has the following constitutions.

(Constitution 1) A program causing a computer to quantize a gray level indicating the depth of color of each pixel in an image, the quantization including: a pixel selecting process of sequentially selecting pixels to be quantized; a use rate determining process of determining a noise use rate indicating the degree to which a dither matrix noise which is noise designated by a predetermined dither matrix has an influence on the quantization and an error use rate indicating the degree to which an accumulated error obtained by accumulating a quantization error which is an error generated in the quantization on peripheral pixels has an influence on the quantization, in which the noise use rate and the error use rate corresponding to the corresponding pixel are determined depending on the gray levels of the pixels sequentially selected through the pixel selecting process; and a quantization executing process of performing the quantization on the gray levels of the pixels sequentially selected through the pixel selecting process, in which the quantization is performed using the dither matrix noise based on the noise use rate corresponding to the corresponding pixel and using the accumulated error based on the error use rate corresponding to the corresponding pixel.

The dither process and the error diffusion process are different from each other in the gray level range in which good image quality is obtained. Accordingly, when any one is used singly, the image quality may degrade due to the quantization in some gray level ranges. For example, when the dither process and the error diffusion process are switched depending on the gray level range, a boundary line and the like may be formed in a part in which both processes are switched.

On the contrary, by employing the above-mentioned constitution, for example, the spatial frequency characteristic (hereinafter, referred to as the dither characteristic) of the dither process can have an influence on the spatial frequency characteristic (hereinafter, referred to as an error diffusion characteristic) of the error diffusion process. Accordingly, it is possible to perform the quantization, for example, through a combination of the dither characteristic into the error diffusion characteristic. The spatial frequency characteristic is a characteristic when the repeated ON and OFF pattern of dots in the print result, which is one characteristic used to estimate the image quality, is grasped as a frequency.

According to this constitution, for example, unlike the case where the dither process and the error diffusion process are simply switched, it is possible to perform the quantization process more appropriately using the parts at which the processes are good. Accordingly, by employing this constitution, it is possible to solve various problems in print caused, for example, in the quantization process and to perform the quantization process through the use of a more appropriate method.

In the pixel selecting process, for example, lines of pixels are sequentially selected and then the pixels in the selected line are sequentially selected in a predetermined processing direction. In this case, the processing direction of the pixel selecting process may be switched for each line to be processed. For example, it can be considered that the pixels are sequentially selected from left to right in the odd lines and from right to left in the even lines. By employing this constitution, for example, the quantization process is performed in two directions and the diffusion direction of the error is not fixed, thereby more appropriately distributing the dots.

The use rate determining process determines the noise use rate and the error use rate, for example, by the use of a predetermined computational expression. In this case, for example, by appropriately setting parameters of the expression, it is possible to appropriately suppress the generation of a boundary line in a switching part between an area in which the dither characteristic is dominant and an area in which the error diffusion characteristic is dominant. Accordingly, it is possible to smoothly switch the methods of the quantization process. The optimal values of the parameters can be appropriately acquired, for example, by experiments.

The program causes, for example, a computer to perform the processes for each process color. In this case, for example, the dither matrix to be used may be changed for each process color. By employing this constitution, for example, the value of the dither matrix used in the quantization of the same pixel can be made to vary depending on the process colors. Accordingly, it is possible to appropriately prevent the ovelapping of the dots.

It is preferable that, for example, noise of a blue noise characteristic be used as the dither matrix noise. The blue noise characteristic is a noise biased to a high frequency, for example, when it is expressed by the spatial frequency characteristic, and is hardly perceived with a human sense of sight. The blue noise characteristic is similar to the frequency characteristic of the error diffusion process. Accordingly, by using the dither matrix, it is easy to more easily switch the dither characteristic and the error diffusion characteristics.

The process may cause the computer to further perform, for example, a process of calculating an accumulated error. For example, the program may cause the computer to further perform an error distribution process or the like. The error distribution process is a process of distributing a quantization error caused, for example, by the quantization of a pixel and serves to diffuse the quantization error into the peripheral pixels of the corresponding pixel, for example, through the use of a predetermined diffusion filter (diffusion matrix). Accordingly, the value of the accumulated error corresponding to the respective peripheral pixels of the corresponding pixel is updated. For example, a matrix of Jarvis, Judice & Ninke can be suitably used as the diffusion filter.

(Constitution 2) The program may cause the computer to additionally perform on the pixels sequentially selected through the pixel selecting process: an error-corrected input value calculating process of calculating an error-corrected input value which is a gray level having been corrected on the basis of the accumulated error, in which a value obtained by adding the product of the error use rate and the accumulated error corresponding to the corresponding pixel to the gray level of the corresponding pixel is calculated as the error-corrected input value; and a noise-corrected threshold value calculating process of calculating a noise-corrected threshold value which is a threshold value having been corrected on the basis of the dither matrix noise as a threshold value used for the quantization, in which a value obtained by adding the product of the noise use rate and the dither matrix noise corresponding to the corresponding pixel to a predetermined initial threshold value is calculated as the noise-corrected threshold value, wherein the quantization executing process performs the quantization by comparing the noise-corrected threshold value and the error-corrected input value with each other.

According to this constitution, it is possible to appropriately adjust the degree to which the error diffusion characteristic has an influence by adding the accumulated error multiplied by the error use rate to the gray level of the pixel as an input value of the quantization. By adding the dither matrix noise multiplied by the noise use rate to the initial threshold value, it is possible to appropriately adjust the degree to which the dither characteristic has an influence.

Accordingly, by employing this constitution, it is possible to appropriately set the degrees to which the error diffusion characteristic and the dither characteristic have an influence, for example, depending on the input value. Accordingly, it is possible to perform the quantization process more appropriately using the parts at which the processes are good depending on the input value.

(Constitution 3) The quantization executing process may include: a maximum value determining process of determining whether the gray level of the pixel which is the input value of the quantization is equal to the maximum value of an allowable gray level range; a minimum value determining process of determining whether the gray level of the pixel which is the input value is equal to the minimum value of the allowable gray level range; and a quantization value acquiring process of acquiring a quantization value as the result of the quantization, wherein when it is determined in the maximum value determining process that the input value is equal to the maximum value, the quantization value acquiring process acquires a value to be output when the gray level is larger than the threshold value as the quantization value, and wherein when it is determined in the minimum value determining process that the input value is equal to the minimum value, the quantization value acquiring process acquires a value to be output when the gray level is smaller than the threshold value as the quantization value.

For example, when the input value is equal to the maximum value, it is necessary to set the quantization result to an output value (for example, 1) to be output when the gray level is greater than the threshold value, regardless of the error-corrected input value or the noise-corrected threshold value. When the input value is equal to the minimum value, it is necessary to set the quantization result to an output value (for example, 0) to be output when the gray level is smaller than the threshold value, regardless of he error-corrected input value or the noise-corrected threshold value.

On the contrary, by employing this constitution, it is possible to easily and appropriately set the output value when the input value is equal to the maximum value or the minimum value. Accordingly, it is possible to more appropriately perform the quantization process which is carried out using both the accumulated error and the dither matrix noise. The output values to be output when the gray level is greater than the threshold value and when the gray level is smaller than the threshold value mean the output values indicating the comparison result of the gray level with the threshold value, for example, when both the accumulated error and the dither matrix noise are set to 0.

(Constitution 4) In determining the noise use rate and the error use rate, the use rate determining process may set the noise use rate when the gray level of the pixel is a gray level corresponding to one of a highlighted part and a shadowed part to a value larger than the noise use rate when the gray level of the pixel is a gray level corresponding to a halftone part of which the gray level is between the gray levels of the highlighted part and the shadowed part, and may set the error use rate when the gray level of the pixel is a gray level corresponding to one of the highlighted part and the shadowed part to a value smaller than the error use rate when the gray level of the pixel is the gray level corresponding to the halftone part.

The noise use rate is, for example, 1 (100%) in the highlighted part and the shadowed part and varies to gradually decrease as it goes closer to the halftone. The error use rate is, for example, 0 (0%) at both ends of the gray level range and varies to be the value 1 (100%) just before the gray level range of a texture-generated part.

According to this constitution, for example, when the influence of the error diffusion characteristic is great, the noise use rate is set to be high and the error use rate is set to be low in the highlighted part and the shadowed part in which the dot delay can be easily generated. Accordingly, since the influence of the dither characteristic of distributing and arranging the dots becomes greater, for example, in the highlighted part and the shadowed part, it is possible to appropriately suppress the generation of the dot delay.

By performing the quantization process in the halftone part with the greater influence of the error diffusion characteristic, for example, it is possible to obtain a more natural pseudo-gradation. For example, by lowering the noise use rate and raising the error use rate in the gray level range of the texture-generated part to give a change to the arrangement of dots, for example, it is possible to appropriately suppress the generation of texture.

(Constitution 5) The use rate determining process may set the noise use rate to a value equal to or larger than the lowest noise use rate set to a value larger than 0 in advance even when the gray level of the pixel has any value.

When the noise use rate in the halftone part is set to 0 (0%) and the error use rate therein is set to 1 (100%), a pattern noise specific to the error diffusion characteristics maybe generated. The reason for generating the pattern noise in the halftone part is that the arrangement of dots can have a checkered pattern, for example, since the error diffusion characteristic in the halftone part exhibits a very high frequency and the checkered pattern is partially generated since the dot arrangement pattern is not fixed like the dither process. On the contrary, by providing the lowest noise use rate so as not to set the noise use rate to 0, the influence of the dither characteristic is made to slightly decrease and the influence of the error diffusion characteristic is made to increase, for example, in the halftone part. Accordingly, since the influence of the dither process on the dot arrangement pattern decreases, the whole arrangement pattern can be easily fixed and the partial checkered pattern is hardly generated. As a result, for example, it is possible to appropriately suppress the pattern noise.

(Constitution 6) The use rate determining process may use a first highlight reference value set in advance and a second highlight reference value larger than the first highlight reference value as a reference indicating the gray level range of the highlighted part; may use a first shadow reference value set in advance and a second shadow reference value larger than the first shadow reference value as a reference indicating the gray level range of the shadowed part; may use a first halftone reference value which is larger than the second highlight reference value and smaller than the first shadow reference value and a second halftone reference value which is larger than the first halftone reference value and smaller than the first shadow reference value as a reference indicating the gray level range at the center of the halftone part; may set the noise use rate to 1 when the gray level of the pixel is equal to or less than the first highlight reference value or when the gray level of the pixel is equal to or more than the second shadow reference value; may set the noise use rate to the lowest noise use rate when the gray level of the pixel is equal to or more than the first halftone reference value and equal to or less than the second halftone reference value; may set the noise use rate to a value which is equal to or more than the lowest noise use rate and equal to or less than 1 and which gradually decreases from 1 depending on the difference between the gray level of the pixel and the first highlight reference value when the gray level of the pixel is equal to or more than the first highlight reference value and equal to or less than the first halftone reference value; may set the noise use rate to a value which is equal to or more than the lowest noise use rate and equal to or less than 1 and which gradually increases from the lowest noise use rate depending on the difference between the gray level of the pixel and the second halftone reference value when the gray level of the pixel is equal to or more than the second halftone reference value and equal to or less than the second shadow reference value; may set the error use rate to 1 when the gray level of the pixel is equal to or more than the second highlight reference value and equal to or less than the first shadow reference value; may set the error use rate to a value which is equal to or more than 0 and equal to or less than 1 and which gradually decreases from 1 depending on the difference between the second highlight reference value and the gray level when the gray level of the pixel is equal to or less than the second highlight reference value; and may set the error use rate to a value which is equal to or more than 0 and equal to or less than 1 and which gradually decreases from 1 depending on the difference between the gray level of the pixel and the first shadow reference value when the gray level of the pixel is equal to or more than the first shadow reference value.

By employing this configuration, it is possible to appropriately set the error use rate and the noise use rate, for example, depending on the gray level of a pixel. Accordingly, it is possible to appropriately perform the quantization process more appropriately using the parts at which the error diffusion process and the dither process are good.

(Constitution 7) The use rate determining process may additionally use a third highlight reference value which is larger than 0 and equal to or less than the first highlight reference value as the reference indicating the gray level range of the highlighted part; may additionally use a third shadow reference value which is equal to or more than the second shadow reference value and smaller than the maximum value of the allowable gray level range as the reference indicating the gray level range of the shadowed part; may set the error use rate to 0 when the gray level of the pixel is equal to or less than the third highlight reference value; may set the error use rate to a value obtained by dividing the difference between the gray level of the pixel and the third highlight reference value by the difference between the second highlight reference value and the third highlight reference value when the gray level of the pixel is equal to or more than the third highlight reference value and equal to or less than the second highlight reference value; may set the error use rate to a value obtained by dividing the difference between the third shadow reference value and the gray level of the pixel by the difference between the third shadow reference value and the first shadow reference value when the gray level of the pixel is equal to or more than the first shadow reference value and equal to or less than the third shadow reference value; and may set the error use rate to 0 when the gray level of the pixel is equal to or more than the third shadow reference value. By employing this constitution, for example, it is possible to more appropriately set the error use rate.

(Constitution 8) There is provided an image processing apparatus quantizing a gray level indicating the depth of color of each pixel in an image, including: a pixel selecting unit that sequentially selects pixels to be quantized; a use rate determining unit that determines a noise use rate indicating the degree to which a dither matrix noise which is a noise designated by a predetermined dither matrix has an influence on the quantization and an error use rate indicating the degree to which an accumulated error obtained by accumulating a quantization error which is an error generated in the quantization on peripheral pixels has an influence on the quantization and that determines the noise use rate and the error use rate corresponding to the corresponding pixel depending on the gray levels of the pixels sequentially selected by the pixel selecting unit; and a quantization executing unit that performs the quantization on the gray levels of the pixels sequentially selected by the pixel selecting unit and that performs the quantization using the dither matrix noise based on the noise use rate corresponding to the corresponding pixel and using the accumulated error based on the error use rate corresponding to the corresponding pixel. By employing this constitution, for example, it is possible to achieve the same advantages as in Constitution 1.

The image processing apparatus may be, for example, a computer operating in accordance with a predetermined program. In this case, for example, a CPU of the computer serves as the constituents of the image processing apparatus in accordance with the program.

(Constitution 9) There is provided an image processing method of quantizing a gray level indicating the depth of color of each pixel in an image, including: a pixel selecting step of sequentially selecting pixels to be quantized; a use rate determining step of determining a noise use rate indicating the degree to which a dither matrix noise which is noise designated by a predetermined dither matrix has an influence on the quantization and an error use rate indicating the degree to which an accumulated error obtained by accumulating a quantization error which is an error generated in the quantization on peripheral pixels has an influence on the quantization and determining the noise use rate and the error use rate corresponding to the corresponding pixel depending on the gray levels of the pixels sequentially selected in the pixel selecting step; and a quantization executing step of performing the quantization on the gray levels of the pixels sequentially selected in the pixel selecting step and performing the quantization using the dither matrix noise based on the noise use rate corresponding to the corresponding pixel and using the accumulated error based on the error use rate corresponding to the corresponding pixel. Accordingly, for example, it is possible to achieve the same advantages as in Constitution 1.

Advantage of the Invention

According to the invention, it is possible to perform the quantization process, for example, through the use of a more appropriate method. Accordingly, it is possible to appropriately suppress the generation of texture, the dot delay, the generation of a pattern noise, and the like, for example, in the halftone process.

BRIEF DESCRIPTION OF DRAWINGS

FIGS. 1(a)~1(b) are diagrams illustrating a program according to an embodiment of the invention, where FIG. 1(a) shows an example of the configuration of a printing system 10 using the program and FIG. 1(b) schematically shows a quantization process performed by an image processing apparatus 12.

FIGS. 3(a)~3(b) are diagrams specifically illustrating a pixel selecting process S102, where FIG. 3(a) shows an example of a procedure of sequentially selecting pixels and FIG. 3(b) shows an example of the advantage of a bidirectional process.

FIG. 4 is a diagram illustrating exemplary graph and computational expression correlating an error use rate Re, a noise use rate Rn, and a gray level In(x, y) with each other.

FIG. 8(a) shows an example of diffusion filters used in the respective directions of the bidirectional process and FIG. 8(b) shows an example of an error distributing method.

FIG. 10(a) shows an example of the printing result when only a known typical error diffusion process is performed, FIG. 10(b) shows an example of the printing result when only a known dither process is performed, FIG. 10(c) shows an example of the printing result when the dither process and the error diffusion process are simply switched depending on the gray level range, and FIG. 10(d) shows an example of the printing result according to the embodiment.

BEST MODE FOR CARRYING OUT THE INVENTION

Figure 2:
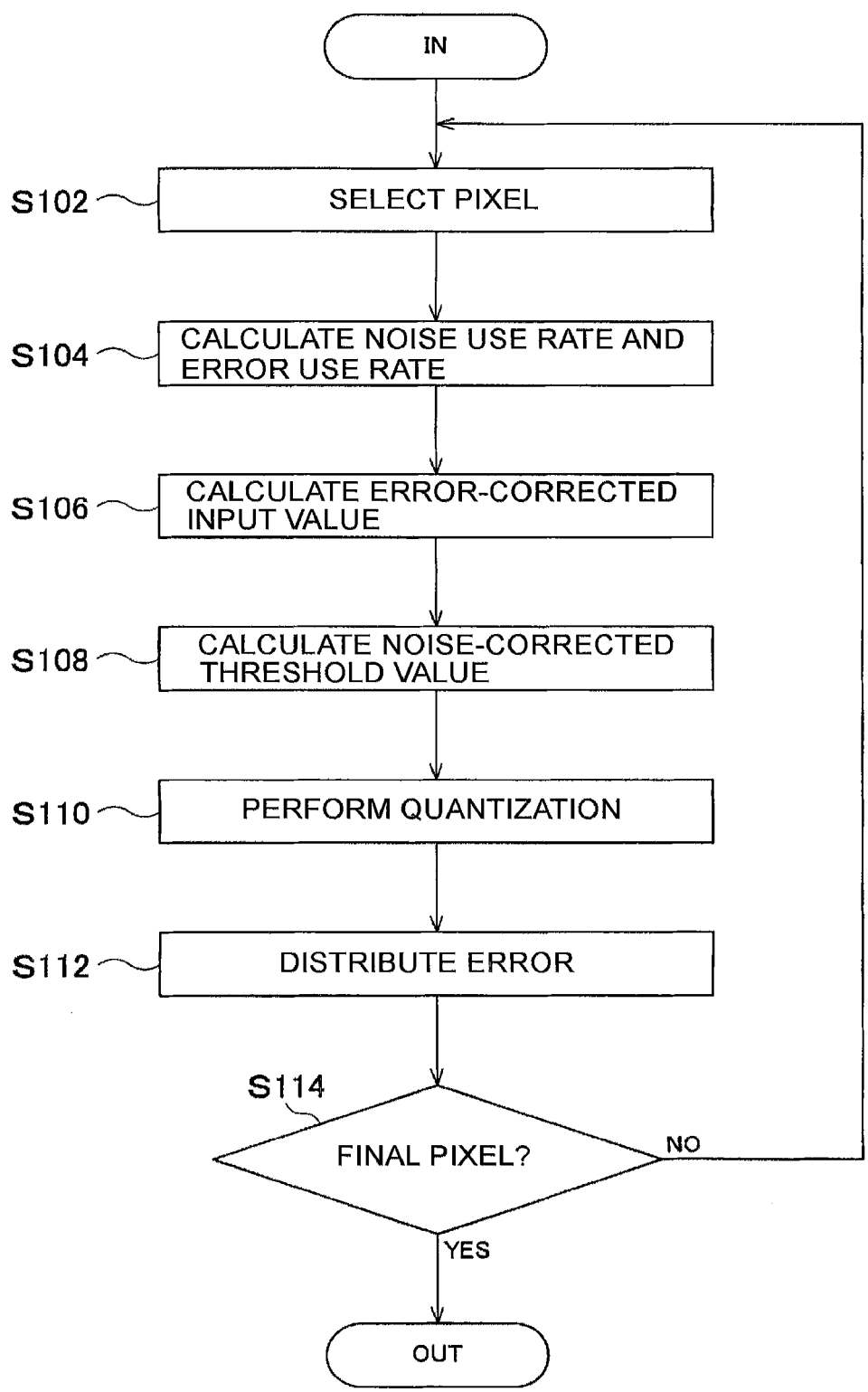
FIG. 2 is a flowchart illustrating an example of the quantization operation.

Hereinafter, an embodiment of the invention will be described with reference to the accompanying drawings. FIGS. 1(a)~1(b) are diagrams illustrating a program according to an embodiment of the invention. FIG. 1(a) shows an example of the configuration of a printing system 10 using the program. In this embodiment, the printing system 10 includes an image processing apparatus 12 and a printing machine 14.

The image processing apparatus 12 is an apparatus performing an image forming process such as a RIP (Raster Image Processor) process. The image processing apparatus 12 generates printable data indicating an image in the format which can be analyzed by the printing machine 14 by developing an original image indicated by print data.

In this embodiment, the image processing apparatus 12 quantizes at least the gray level indicating the depth of color of each pixel in the original image in the image forming process. In this case, the image processing apparatus 12 performs the quantization for each process color used in the printing machine 14. Accordingly, the image processing apparatus 12 forms a halftone image corresponding to each process color on the basis of the print data.

The image processing apparatus 12 is, for example, a host PC controlling the printing machine 14 and operates as an image processing apparatus in accordance with a predetermined program. The image processing apparatus 12 may receive the print data from, for example, another PC. The print data may be prepared by the image processing apparatus 12 by a user.

The printing machine 14 is, for example, an ink jet printer and prints an image on the basis of printable data received from the image processing apparatus 12. In this embodiment, the printing machine 14 performs a color printing operation using the colors of CMYK ink as process colors. The printing machine 14 may perform the printing operation using additional colors of ink.

FIG. 1(b) is a diagram schematically illustrating the quantization process performed by the image processing apparatus 12. The image processing apparatus 12 forms a pseudo-halftone image which is halftone image by quantizing the original image for each process color. The quantization is a process of converting the gray levels $In(x, y)$ at the coordinates of the original image into quantization values out $(x, y)$ at the same coordinates of the pseudo-halftone image.

In this embodiment, the image processing apparatus 12 performs the quantization through the use of a method (hybrid error diffusion process) using both a dither matrix noise $D(i, j)$ and an accumulated error $E(x, y)$. The image processing apparatus 12 additionally uses a noise use rate Rn and an error use rate Re set to values in the range of 0 to 1 (0% to 100%) as parameters based on the dither matrix noise $D(i, j)$ and the accumulated error $E(x, y)$.

The noise use rate Rn is a parameter indicating the degree to which the dither matrix noise $D(i, j)$ has an influence on the quantization process and is calculated on the basis of the gray level $In(x, y)$ of the pixel to be quantized. The image processing apparatus 12 performs the quantization using the product of the dither matrix noise $D(i, j)$ and the noise use rate Rn without using the dither matrix noise $D(i, j)$ itself. Accordingly, the image processing apparatus 12 uses the dither matrix noise $D(i, j)$ depending on the noise use rate Rn corresponding to each pixel.

The error use rate Re is a parameter indicating the degree to which the accumulated error $E(x, y)$ has an influence on the quantization process and is calculated on the basis of the gray level $In(x, y)$ of the pixel to be quantized. The image processing apparatus 12 calculates an error-corrected input value $In'(x, y)$ corresponding to the gray levels $In(x, y)$ of each pixel using the product of the accumulated error $E(x, y)$ and the error use rate Re without using the accumulated error $E(x, y)$ itself. The image processing apparatus performs the quantization process using the calculated error-corrected input value $In'(x, y)$. Accordingly, the image processing apparatus 12 uses the accumulated error $E(x, y)$ depending on the error use rate Re corresponding to each pixel. The quantization process will be described in more detail later.

According to this embodiment, for example, it is possible to have an influence of the spatial frequency characteristic (dither characteristic) of the dither process on the spatial frequency characteristic (error diffusion characteristic) of the error diffusion process. Accordingly, the quantization can be performed, for example, through the use of a method in which the dither characteristic is combined into the error diffusion characteristic. In this case, for example, unlike the case where the dither process and the error diffusion process are simply switched, it is possible to appropriately prevent the generation of a boundary line due to the switching of the processes.

Accordingly, according to this embodiment, it is possible, for example, to perform the quantization process using appropriately using the parts at which the processes are good. As a result, for example, it is possible to appropriately solve various problems in print caused in the quantization process and to perform the quantization process through the use of a more appropriate method.

The dither matrix noise $D(i, j)$ is, for example, a value designated by a predetermined dither matrix. The dither matrix noise $D(i, j)$ may be identical or similar to the dither matrix noise used in the dither process according to the background art. It is preferable that, for example, noise of a blue noise characteristic is used as the dither matrix noise $D(i, j)$. It is preferable that the image processing apparatus 12 changes the dither matrix to be used for each process color.

The accumulated error $E(x, y)$ is a value obtained by accumulating the quantization errors $Q(x, y)$ which are errors based on the quantization on peripheral pixels and is calculated using a predetermined diffusion filter (diffusion matrix). The calculated accumulated error $E(x, y)$ is stored, for example, in an error buffer. The image processing apparatus 12 calculates the accumulated error $E(x, y)$ through the use of the method identical or similar to calculating the accumulated error used in the error diffusion process according to the background art.

FIG. 2 is a flowchart illustrating an example of the quantization operation. The image processing apparatus 12 performs the following process, for example, for each process color.

In the quantization operation, the image processing apparatus 12 according to this embodiment first selects a pixel to be quantized from the original image (pixel selecting process S102). Then, the image processing apparatus calculates the noise use rate Rn and the error use rate Re corresponding to the selected pixel depending on the gray level $In(x, y)$ of the corresponding pixel. Accordingly, the image processing apparatus 12 determines the noise use rate Rn and the error use rate Re used in quantizing the pixel (use rate determining process S104).

Subsequently, the image processing apparatus 12 calculates the error-corrected input value $In'(x, y)$ which is the gray level after performing the correction using the accumulated error E(x, y) (error-corrected input value calculating process S106). In this process, for example, the image processing apparatus 12 adds the product of the error use rate Re corresponding to the pixel selected in the pixel selecting process S102 and the accumulated error E(x, y) to the gray level In(x, y) of the corresponding pixel and calculates the added value as the error-corrected input value In'(x, y).

The image processing apparatus 12 calculates a noise-corrected threshold value Th' which is a threshold value reflecting the dither matrix noise D(i, j) as the threshold value used in the quantization (noise-corrected threshold value calculating process S108). In this process, for example, the image processing apparatus 12 adds the product of the noise use rate Rn corresponding to the pixel selected in the pixel selecting process S102 and the dither matrix noise D(i, j) to a predetermined initial threshold value Th and calculates the added value as the noise-corrected threshold value Th'.

The image processing apparatus 12 compares the error-corrected input value In'(x, y) with the calculated noise-corrected threshold value Th'. Accordingly, the image processing apparatus 12 executes the quantization on the pixel selected in the pixel selecting process S102 (quantization executing process S110).

Subsequently, the image processing apparatus 12 diffuses the quantization error Q(x, y) generated through the quantization of the pixel to the peripheral pixels through the use of a diffusion filter (error distributing process S112). Accordingly, the image processing apparatus 12 adds the quantization error Q(x, y) to the value of the diffusion filter corresponding to the distribution destination coordinates of the peripheral pixels and updates the value of the accumulated error E(x, y) corresponding to the respective peripheral pixels.

After the error distributing process S112, the image processing apparatus 12 determines whether the pixel having been subjected to the quantization is the final pixel of the original image (final pixel determining process S114). When it is determined that the pixel is the final pixel (Yes in S114), the image processing apparatus ends the quantization process to the original image. When it is determined that the pixel is not the final pixel (No in S114), the image processing apparatus selects a next pixel in the pixel selecting process S102 again. Accordingly, the image processing apparatus 12 sequentially selects the pixels to be quantized in the pixel selecting process S102. By performing the processes subsequent to the pixel selecting process S102 on the pixels to be sequentially selected, the image processing apparatus performs the quantization on the pixels.

According to this embodiment, for example, by adding the accumulated error E(x, y) multiplied by the error use rate Re to the gray level In(x, y), it is possible to appropriately adjust the degree to which the error diffusion characteristic has an influence. By adding the dither matrix noise D(i, j) multiplied by the noise use rate Rn to the initial threshold value Th, it is possible to appropriately adjust the degree to which the dither characteristic has an influence.

Accordingly, it is possible to appropriately set the degree to which the error diffusion characteristic and the dither characteristic have an influence, for example, depending on the gray level In(x, y) as the input value. It is also possible to perform the quantization process appropriately using the parts at which the error diffusion process and the dither process are good. Hereinafter, the processes of the quantization operation will be described in more detail.

FIGS. 3(a)~3(b) are diagrams illustrating the pixel selecting process S102 in more detail. FIG. 3(a) shows an example of the sequence of sequentially selecting the pixels. In the pixel selecting process S102 of this embodiment, the image processing apparatus 12 sequentially selects, for example, lines of pixels and then sequentially selects the pixels in the selected line in a predetermined processing direction. The image processing apparatus 12 switches the processing direction for each line to be processed. For example, the image processing apparatus 12 sequentially selects the pixels from left to right in the odd lines and from right to left in the even lines. Accordingly, the image processing apparatus 12 performs the quantization process in two directions.

FIG. 3(b) is a diagram illustrating an example of an advantage of the bidirectional process and shows examples of the quantization result when the only one direction is used as the processing direction and when two directions are used as the processing direction. When the bidirectional process is performed, the diffusing direction of the error is not fixed and it is thus possible to more appropriately distribute the dots. As a result, compared with the case where the quantization process is performed in only one direction, it is possible to more appropriately prevent the generation of the worm noise or the like.

Figure 5:
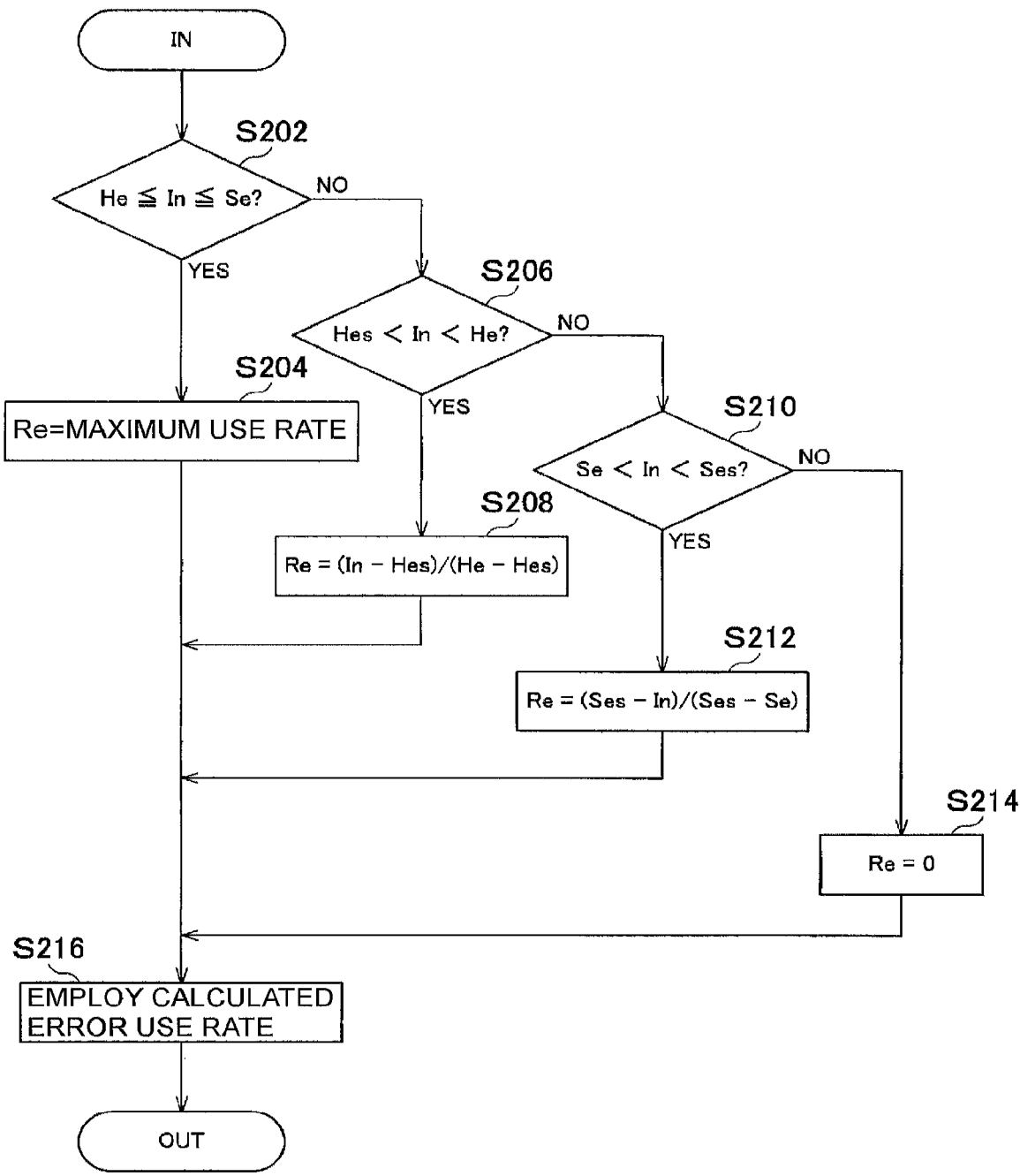
FIG. 5 is a flowchart illustrating an example of a process of calculating the error use rate Re.
Figure 6:
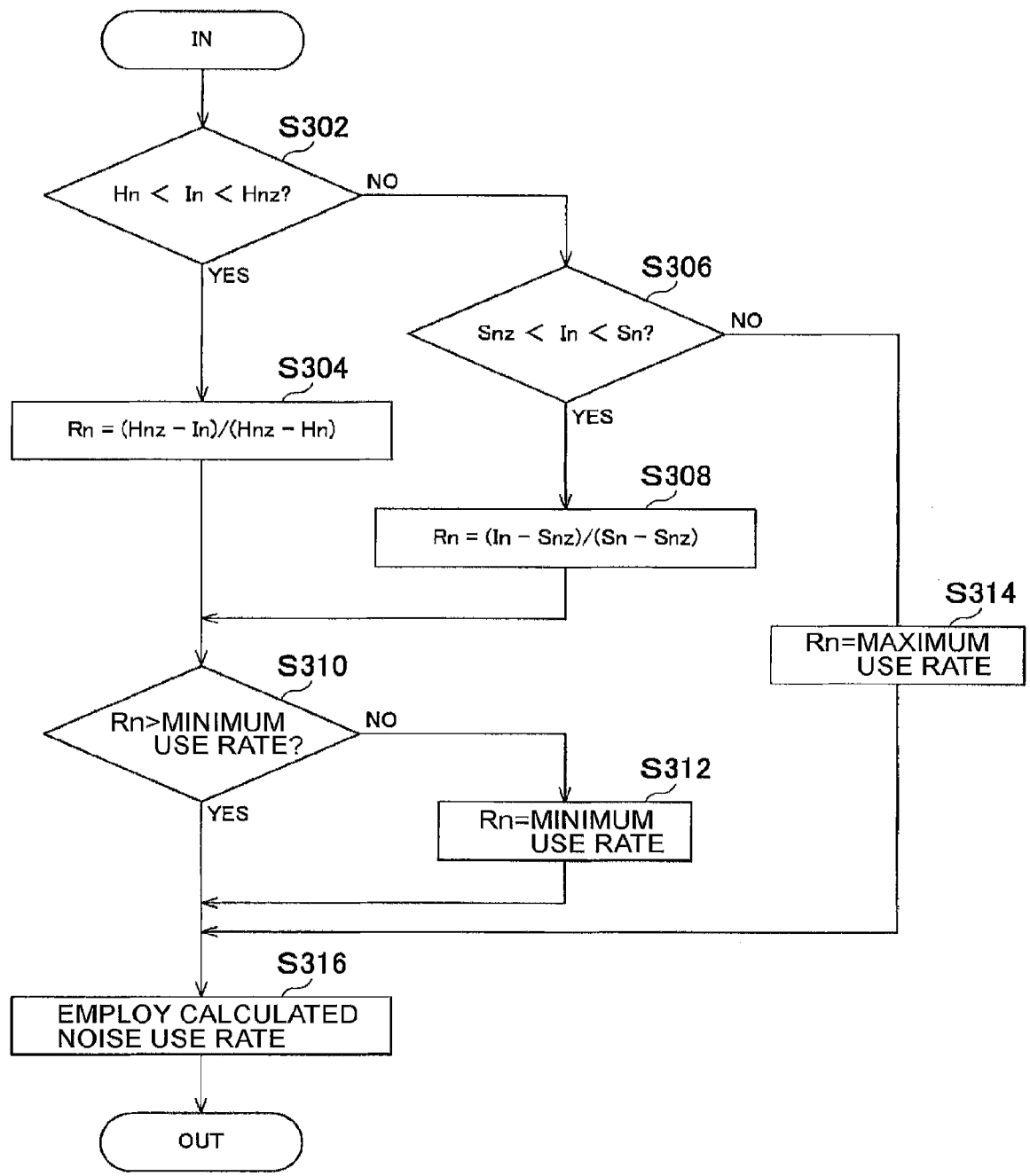
FIG. 6 is a flowchart illustrating an example of a process of calculating a noise use rate Rn.

FIGS. 4 to 6 are diagrams illustrating the use rate determining process S104 in more detail. FIG. 4 shows examples of a graph and a computational expression correlating the error use rate Re, the noise use rate Rn, and the gray level In(x, y) (hereinafter, referred to as an input value).

In this embodiment, the image processing apparatus 12 calculates the error use rate Re and the noise use rate Rn on the basis of a function continuously varying with respect to the input value In in the range of 0 as the minimum input value MinIn to the maximum input value MaxIn. The maximum input value MaxIn and the minimum input value MinIn are, for example, the maximum value and the minimum value in the allowable range of the gray level as the input value In, respectively.

In this function, the image processing apparatus 12 uses a highlight-side error use rate minimum gray level Hes which is an example of the third highlight reference value, a highlight-side noise use rate maximum gray level Hn which is an example of the first highlight reference value, and a highlight-side error use rate maximum gray level He which is an example of the second highlight reference value as a reference indicating the gray level range in the highlighted part. The image processing apparatus uses a shadow-side error use rate maximum gray level Se which is an example of the first shadow reference value, a shadow-side noise use rate maximum gray level Sn which is an example of the second shadow reference value, and a shadow-side error use rate minimum gray level Ses which is an example of the third shadow reference value as a reference indicating the gray level range in the shadowed part. The image processing apparatus uses a highlight-side noise use rate 0% gray level Hnz, a shadow-side noise use rate 0% gray level Snz, a first halftone reference value C1, and a second halftone reference value C2 as a reference indicating the gray level range including the initial threshold value Th at the center of the halftone part.

These parameters are set to satisfy at least Hes≤Hn<He<Se<Sn≤Ses and Hn<Hnz<Snz<Sn. In this embodiment, the parameters are set to satisfy the magnitude relationship 0 (MinIn) <Hes≤Hn<He<C1<Hnz<Th<Snz<C2<Se<Sn≤Ses<MaxIn.

In the use rate determining process S104, the image processing apparatus 12 determines the error use rate Re and the noise use rate Rn on the basis of the computational expression shown below the graph. Here, when the noise use rate Rn calculated by the use of this expression is smaller than a predetermined lowest noise use rate RnMin, the image processing apparatus 12 sets the noise use rate Rn to the lowest noise use rate RnMin. Accordingly, the image processing apparatus 12 sets the noise use rate Rn to a value equal to or more than the lowest noise use rate RnMin even when the gray level of a pixel has any value.

The error use rate Re and the noise use rate Rn are set to the values in the range of 0% to 100% (the values in the range of 0 to 1). When a value of 100% or more is calculated through the use of the computational expression shown below the graph, the value is set to 100%. When the calculated value is equal or less than 0%, the value is set to 0%.

The lowest noise use rate RnMin is set to a value greater than 0 in advance, for example, when setting or adjusting the parameters. It can be considered, for example, that the lowest noise use rate RnMin is set to a value equal to or more than 0.1 (10%). For example, it is preferable that the lowest noise use rate RnMin is set to be, for example, in the range of 0.1 to 0.2 (10% to 20%). As can be seen from the graph, when the input value In is identical to the first halftone reference value C1 or the second halftone reference value C2, the noise use rate Rn calculated through the use of the computational expression is identical to the lowest noise use rate RnMin.

For example, when the input value In is equal to or more than the highlight-side error use rate maximum gray level He and equal to or less than the shadow-side error use rate maximum gray level Se through the use of this method, the image processing apparatus 12 sets the error use rate Re to 1 (100%). For example, when the input value In is equal to or less than the highlight-side error use rate minimum gray level Hes, the image processing apparatus sets the error use rate Re to 0. When the input value In is equal to or more than the highlight-side error use rate minimum gray level Hes and equal to or less than the highlight-side error use rate maximum gray level He, the image processing apparatus sets the error use rate Re to a value calculated by (In−Hes)/(He−Hes). Accordingly, for example, when the input value In is equal to or less than the highlight-side error use rate maximum gray level He, the image processing apparatus sets the error use rate Re to a value which is in the range of 0 to 1 (100%) and which gradually decreases from 1 depending on the difference between the highlight-side error use rate maximum gray level He and the input value In.

For example, when the input value In is equal to or more than the shadow-side error use rate maximum gray level Se and equal to or less than the shadow-side error use rate minimum gray level Ses, the error use rate Re is set to a value calculated by (Ses−In)/(Ses−Se). When the input value In is equal to or more than the shadow-side error use rate minimum gray level Ses, the error use rate Re is set to 0. Accordingly, for example, when the input value In is equal to or more than the shadow-side error use rate maximum gray level Se, the error use rate Re is set to a value which is in the range of 0 to 1 (100%) and which gradually decreases from 1 depending on the difference between the input value In and the shadow-side error use rate maximum gray level Se.

In this case, the error use rate Re from the highlighted part to the halftone part slowly increase, for example, from the highlight-side error use rate minimum gray level Hes with respect to the input value In and becomes the maximum value at the highlight-side error use rate maximum gray level He. The error use rate Re from the shadowed part to the halftone part slowly decreases from the shadow-side error use rate maximum gray level Se with respect to the input value In and becomes the minimum value at the shadow-side error use rate minimum gray level Ses.

Accordingly, the image processing apparatus 12 sets, for example, the error use rate Re when the input value In is a gray level corresponding to any of the highlighted part and the shadowed part to a value smaller than the error use rate Re when the input value is a gray level corresponding to the halftone part. In this case, the error use rate Re has the value of 0 (0%), for example, at both ends of the gray level range and varies so as to have a value 1 (100%) just before the texture-generated parts Hd and Sd which is a gray level range where the texture specific to the dither process is generated. By employing this constitution, for example, it is possible to appropriately achieve the constitution in which the error use rate Re is mainly used for the halftone part.

For example, when the input value In is equal to or less than the highlight-side noise use rate maximum gray level Hn or when the input value is equal to or more than the shadow-side noise use rate maximum gray level Sn, the image processing apparatus 12 sets the noise use rate Rn to 1 (100%). When the input value In is equal to or more than the first halftone reference value C1 and equal to or less than the second halftone reference value C2, the image processing apparatus sets the noise use rate Rn to the lowest noise use rate RnMin.

For example, when the input value In is equal to or more than the highlight-side noise use rate maximum gray level Hn and equal to or less than the first halftone reference value C1, the image processing apparatus 12 sets the noise use rate Rn to a value which is equal to or more than the lowest noise use rate RnMin and equal or less than 1 (100%) and which gradually decreases from 1 depending on the difference between the input value In and the highlight-side noise use rate maximum gray level Hn. For example, when the input value In is equal to or more than the second halftone reference value C2 and equal to or less than the shadow-side noise use rate maximum gray level Sn, the image processing apparatus 12 sets the noise use rate Rn to a value which is equal to or more than the lowest noise use rate RnMin and equal to or less than 1 (100%) and which gradually increases from the lowest noise use rate RnMin depending on the difference between the input value In and the second halftone reference value C2.

Accordingly, the image processing apparatus 12 sets, for example, the noise use rate Rn when the input value In is a gray level corresponding to any of the highlighted part and the shadowed part to a value greater than the noise use rate Rn when the input value is a gray level corresponding to the halftone part. In this case, the noise use rate Rn has a value of 1 (100%), for example, in the highlighted part and the shadowed part and varies so as to slowly decrease as it goes closer to the halftone part.

According to this embodiment, for example, when the influence of the error diffusion characteristic becomes greater, the noise use rate Rn in the highlighted part and the shadowed part in which the dot delay can be easily generated is set to be higher and the error use rate Re is set to be lower. Accordingly, since the influence of the dither characteristic allowing the dots to be distributed and arranged becomes greater, for example, in the highlighted part and the shadowed part, it is possible to appropriately suppress the generation of the dot delay.

By performing the quantization process on the halftone part with the increased influence of the error diffusion characteristic, for example, it is possible to obtain a more natural pseudo-gradation. For example, by lowering the noise use rate Rn and raising the error use rate Re in the gray level range of the texture-generated part, it is possible to vary the arrangement of dots. As a result, for example, it is possible to appropriately suppress the generation of texture.

For example, by providing the lowest noise use rate RnMin so as not to set the noise use rate Rn to 0, for example, it is possible to enhance the influence of the error diffusion characteristic while giving a slight influence of the dither characteristic to the halftone part. As a result, for example, it is possible to appropriately suppress the pattern noise.

For example, by slowly varying the magnitude of the influence of the dither characteristic and the magnitude of the influence of the error diffusion characteristic depending on the computational expressions for calculating the error use rate Re and the noise use rate Rn, it is possible to appropriately suppress the generation of a boundary line in the switching part between an area in which the dither characteristic is dominant and an area in which the error diffusion characteristic is dominant. As a result it is possible to smoothly switch the methods of the quantization process.

Therefore, according to this embodiment, it is possible to appropriately set the error use rate Re and the noise use rate Rn, for example, depending on the gray level of a pixel. Accordingly, it is possible to appropriately perform the quantization process more appropriately using the parts at which the error diffusion process and the dither process are good.

The process of calculating the error use rate Re and the noise use rate Rn will be described in more detail below. FIG. 5 is a flowchart illustrating an example of the process of calculating the error use rate Re.

In calculating the error use rate Re, the image processing apparatus 12 first determines whether the input value In is in the range of equal to or more than the highlight-side error use rate maximum gray level He and equal to or less than the shadow-side error use rate maximum gray level Se (S202). When it is determined that the input value is in the range (Yes in S202), the image processing apparatus sets the error use rate Re to 1 (100%) which is the maximum use rate (S204).

When it is determined that the input value is not in the range (No in S202), the image processing apparatus additionally determines whether the input value In is in the range of more than the highlight-side error use rate minimum gray level Hes and less than the highlight-side error use rate maximum gray level He (S206). When it is determined that the input value is in the range (Yes in S206), the image processing apparatus sets the error use rate Re to a value calculated by Re=(In−Hes)/(He−Hes) (S208).

When it is determined in S206 that the input value In is not in the range (No in S206), the image processing apparatus 12 additionally determines whether the input value In is in the range of more than the shadow-side error use rate maximum gray level Se and less than the shadow-side error use rate minimum gray level Ses (S210). When it is determined that the input value is in the range (Yes in S210), the image processing apparatus sets the error use rate Re to a value calculated by Re=(Ses−In)/(Ses−Se) (S212). When it is determined in S210 that the input value In is not in the range (No in S210), the image processing apparatus 12 sets the error use rate Re to 0 (0%) (S214).

The image processing apparatus 12 employs the error use rate Re set in any of S204, S208, S212, and S214 as the error use rate Re corresponding to the input value In (S216). According to this embodiment, it is possible to appropriately calculate the error use rate Re.

FIG. 6 is a flowchart illustrating an example of the process of calculating the noise use rate Rn. In calculating the noise use rate Rn, the image processing apparatus 12 first determines whether the input value In is in the range of more than the highlight-side noise use rate maximum gray level Hn and less than the highlight-side noise use rate 0% gray level Hnz (S302). When it is determined that the input value is in the range (Yes in S302), the image processing apparatus sets the noise use rate Rn to a value calculated by Rn=(Hnz−In)/(Hnz−Hn) (S304).

When it is determined that the input value is not in the range (No in S302), the image processing apparatus additionally determines whether the input value In is in the range of more than the shadow-side noise use rate 0% gray level Snz and less than the shadow-side noise use rate maximum gray level Sn (S306). When it is determined that the input value is in the range (Yes in S306), the image processing apparatus sets the noise use rate Rn to a value calculated by Rn=(In−Snz)/(Sn−Snz) (S308).

After setting the noise use rate Rn to the calculated value in S304 or S308, the image processing apparatus determines whether the set noise use rate Rn is greater than the lowest noise use rate RnMin which is the minimum use rate (S310). When it is determined that the noise use rate Rn is equal to or less than the lowest noise use rate RnMin (No in S310), the image processing apparatus changes the value of the noise use rate Rn to the lowest noise use rate RnMin (S312) and performs the process of S316. When it is determined that the noise use rate Rn is greater than the lowest noise use rate RnMin (Yes in S310), the image processing apparatus performs the process of S316 without changing the value of the noise use rate Rn.

When it is determined in S306 that the input value In is not in the range (No in S306), the image processing apparatus 12 sets the noise use rate Rn to 1 (100%) which is the maximum use rate (S314). Then, the image processing apparatus 12 employs the noise use rate Rn set in any of S304, S308, S312, and S314 as the noise use rate Rn corresponding to the input value In (S316). According to this embodiment, it is possible to appropriately calculate the noise use rate Rn.

Figure 7:
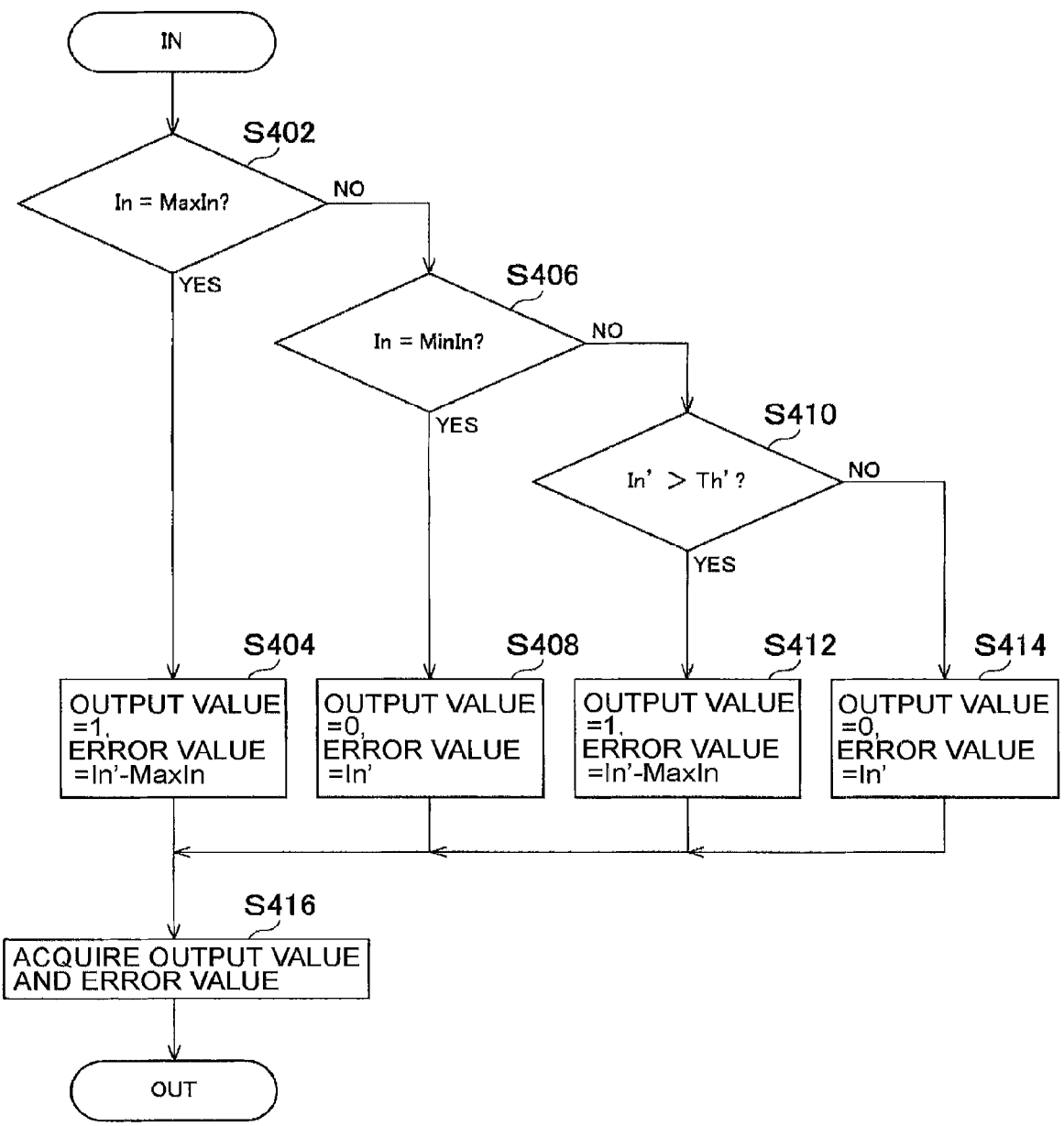
FIG. 7 is a flowchart illustrating an example of the operation of a quantization executing process S110.

FIG. 7 is a flowchart illustrating an example of the operation of the quantization executing process S110. In the quantization executing process S110 of this example, the image processing apparatus 12 first determines whether the input value In is identical to the maximum input value MaxIn (maximum value determining process S402). When it is determined that the input value is identical to the maximum input value (Yes in S402), the image processing apparatus sets the output value indicating the quantization result to 1 (S404). The value 1 is an example of a value to be output when the input value In is more than the threshold value Th. The error value used in the error distributing process S112 later is set to the difference In'−MaxIn between the error-corrected input value In' and the maximum input value MaxIn along with the setting of the output value.

When it is determined in S402 that the input value In is not identical to the maximum input value MaxIn (No in S402), the image processing apparatus 12 additionally determines whether the input value In is identical to the minimum input value MinIn (minimum value determining process S406). When it is determined that the input value is identical to the minimum input value (Yes in S406), the image processing apparatus sets the output value to 0 (S408). The value 0 is an example of the value to be output when the input value In is less than the threshold value Th. The image processing apparatus sets the error value to the error-corrected input value In' along with the setting of the output value.

When it is determined in S406 that the input value In is not identical to the minimum input value MinIn (No in S406), the image processing apparatus 12 determines whether the error-corrected input value In/' is more than the noise-corrected threshold value Th' (S410). When it is determined that the error-corrected input value is more than the noise-corrected threshold value (Yes in S410), the image processing apparatus sets the output value to 1 and sets the error value to In'−MaxIn (S412). When it is determined in S410 that the error-corrected input value In' is equal to or less than the noise-corrected threshold value Th' (No in S410), the image processing apparatus sets the output value to 0 and sets the error value to In' (S414).

The image processing apparatus 12 acquires the output value and the error value set in S404, S408, S412, or S414 as the quantization value and the error value serving as the result of the quantization executing process S110 (quantization value acquiring process S416). The acquired error value is given and taken to and from the later error distributing process S112. According to this embodiment, for example, it is possible to easily and appropriately set the output value and the error value.

Figure 8:
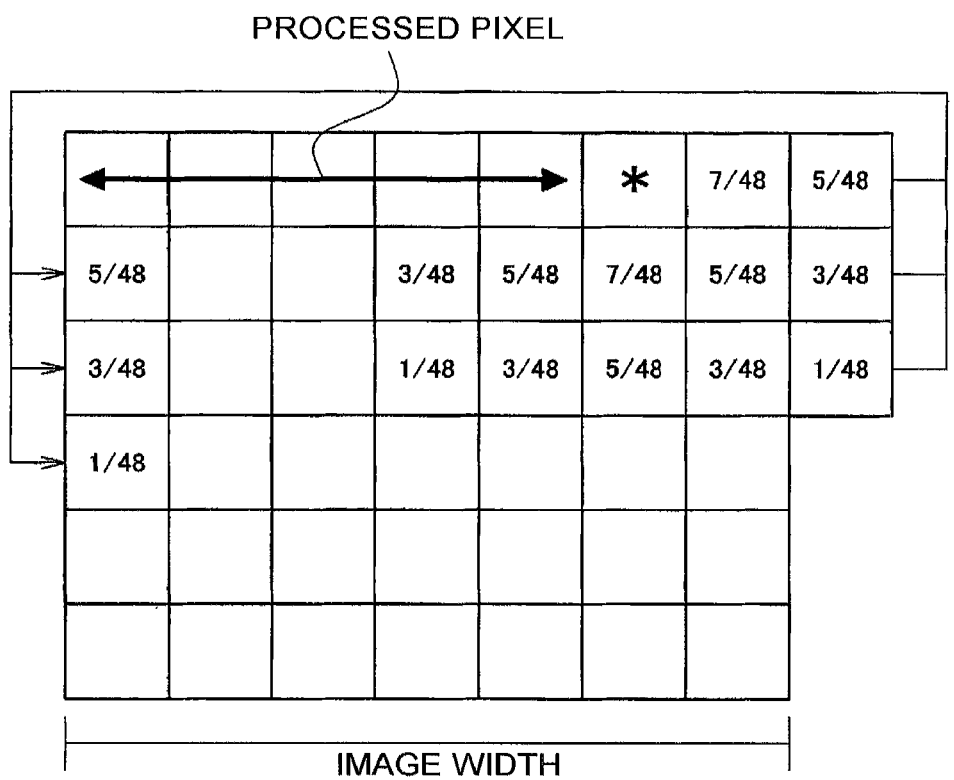
FIGS. 8(a)~8(b) are diagrams illustrating an example of a diffusion filter used in this embodiment, where
Figure 9:
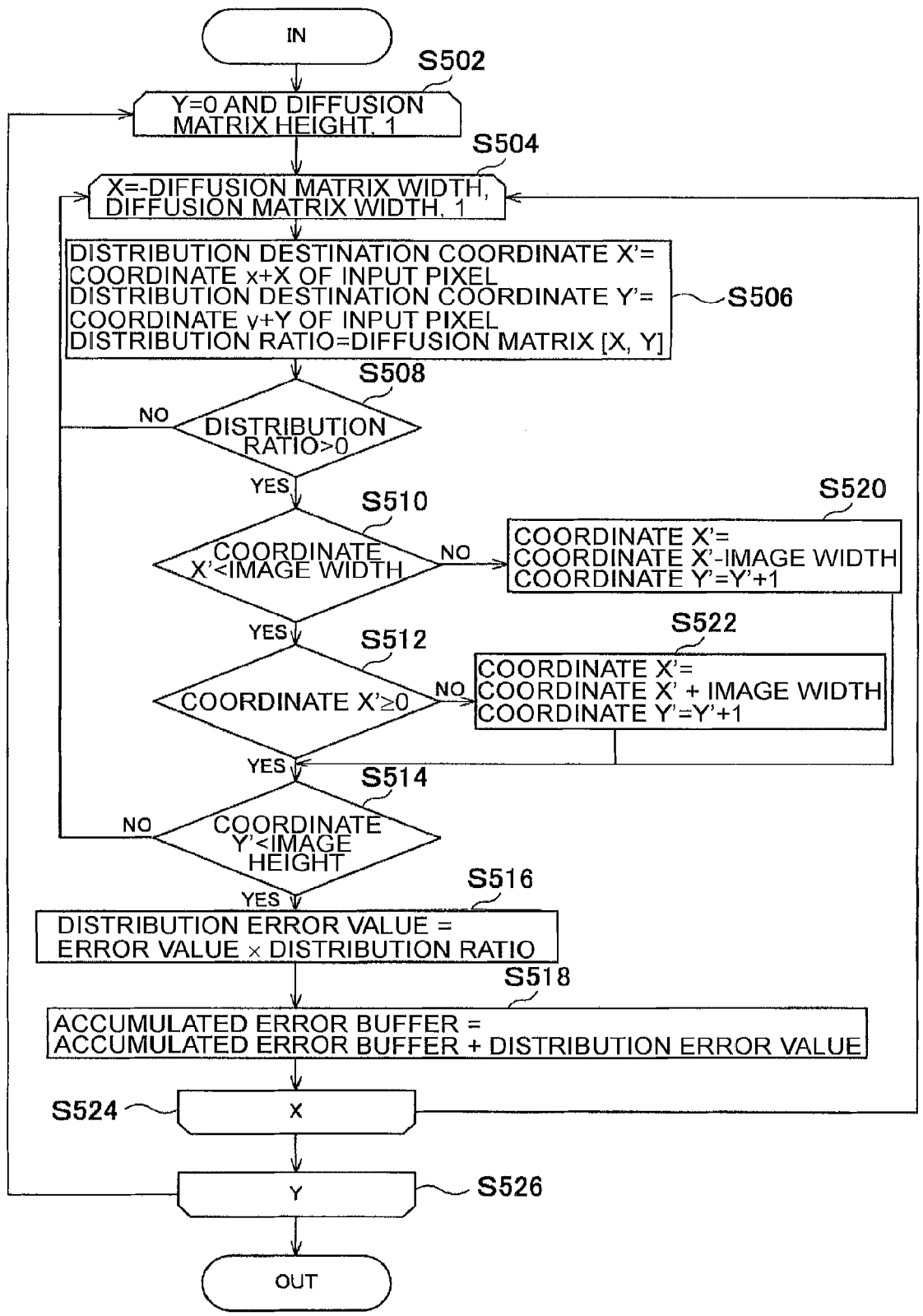
FIG. 9 is a flowchart illustrating an example of the operation of an error distributing process S112.

FIGS. 8(a), 8(b) and 9 are diagrams illustrating the error distributing process S112 in more detail. FIGS. 8(a) and 8(b) show examples of the diffusion filter used in this example. FIG. 8(a) shows examples of the diffusion filters used in the directions of the bidirectional process.

In this example, the diffusion filter is, for example, a matrix of Jarvis, Judice & Ninke. The filters shown in the drawing are used in a main scanning direction and a reverse main scanning direction which are the directions of the bidirectional process. In the filters shown in the drawing, the position to which sign * is written represents the coordinate [0, 0] (origin) of the input value In. The numerical values in the matrixes represent distribution ratios at which the error is distributed to the peripheral pixels.

FIG. 8(b) shows an example of the error distributing method. In the process of distributing the error to the peripheral pixels, when the coordinate of an error distribution destination departs from an image width, the image processing apparatus 12 changes the coordinate of the distribution destination to the head coordinate of the next line. When the opposite coordinate departs from the range, the same process is performed. When the line of the distribution destination is not present, the image processing apparatus 12 does not distribute the error. When the coordinate of the distribution destination indicates a processed pixel, the image processing apparatus does not distribute the error.

FIG. 9 is a flowchart illustrating an example of the operation of the error distributing process S112. In the error distributing process S112, the image processing apparatus 12 performs a loop of sequentially changing the Y coordinate between steps S502 and S526 in the flowchart. In this loop, the image processing apparatus 12 increases the value of Y by 1 between 0 and a diffusion matrix height. For example, the diffusion matrix height means the number of rows of the matrix used as the diffusion filter.

The image processing apparatus performs a loop of sequentially changing the X coordinate between steps S504 and S524. In this loop, the image processing apparatus 12 increases the value of X by 1 between 0 and a diffusion matrix width. For example, the diffusion matrix width means the number of columns of the matrix used as the diffusion filter.

In this loop, the image processing apparatus 12 first sets the coordinate (X', Y') of the distribution destination, as shown in the flowchart. Then, the image processing apparatus sets a distribution ratio depending on the diffusion filter (S506). At this time, the image processing apparatus determines whether the distribution ratio is more than 0 (S508), and performs the process of S504 again without distributing the error when it is determined that the distribution ratio is equal to or less than 0 (No in S508).

When it is determined that the distribution ratio is more than 0 (Yes in S508), the image processing apparatus performs the process subsequent to S510. In this process, when the coordinate X' of the distribution destination is less than the image width (Yes in S510), the coordinate X' is equal to or more than 0 (Yes in S512), and the coordinate Y' of the distribution destination is less than the image height (Yes in S514), the image processing apparatus sets the error value (quantization error) to be distributed to the product of the error value and the distribution ratio (S516) and adds the resultant to the distribution error value stored in the accumulated error buffer (S518). Accordingly, the image processing apparatus 12 updates the accumulated error on the basis of the generated quantization error.

When it is determined in S510 that the coordinate X' is equal to or more than the image width (No in S510), the image processing apparatus sets the coordinate X'=X'–the image width and the coordinate Y'=Y'+1 (S520) and performs the process of S514. When it is determined in S512 that the coordinate X' is less than 0 (No in S512), the image processing apparatus sets the coordinate X'=X'+the image width and the coordinate Y'=Y'+1 (S522) and performs the process of S514. When it is determined in S514 that the coordinate Y' is equal to or more than the image height of the coordinate Y' (No in S514), the image processing apparatus does not distribute the error but performs the process of S504.

By performing this operation, the image processing apparatus 12 integrates the quantization error to the value stored in the accumulated error buffer and calculates the accumulated error. According to this example, it is possible to appropriately distribute the error. Accordingly, it is possible to appropriately calculate the accumulated error.

Figure 10:
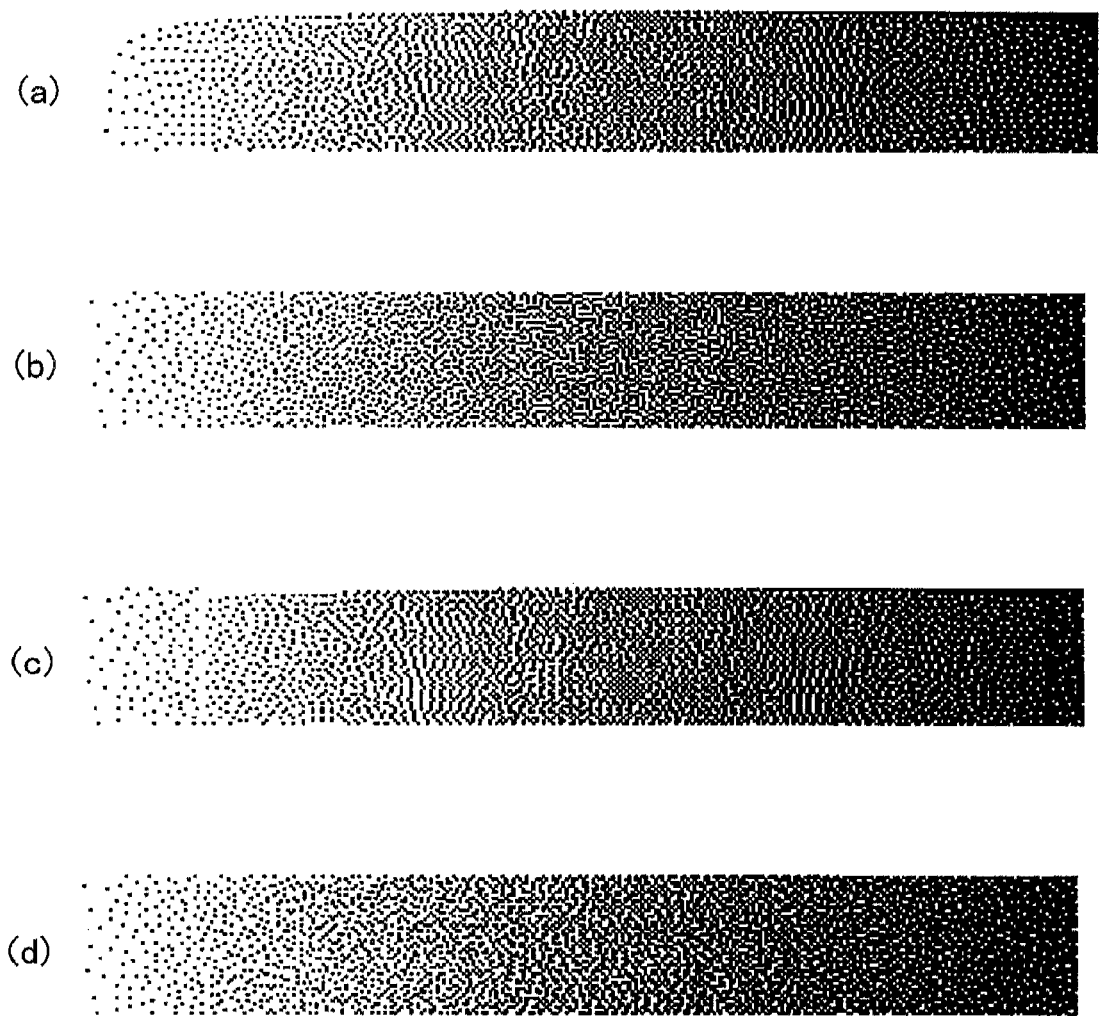
FIGS. 10(a)~10(d) are diagrams illustrating an example of a printing result according to the embodiment along with a printing result according to a reference example, where

FIGS. 10(a)~10(d) show examples of the printing result according to this example along with the printing results according to reference examples. FIGS. 10(a) to 10(c) show the printing results according to the reference examples different from this example described with reference to FIGS. 1 to 9. FIG. 10(a) shows an example of the printing result when only a known typical error diffusion process is performed. FIG. 10(b) shows an example of the printing result when only a known dither process is performed.

When only the typical error diffusion process is performed, the problem such as the dot delay is caused, for example, in the highlighted part or the shadowed part. When only the dither process is performed, the problem such as texture specific to the dither process is caused.

FIG. 10(c) shows an example of the printing result when the dither process and the error diffusion process are simply switched depending on the gray level range. In this example, between the highlighted part and the halftone part or between the halftone part and the shadowed part, the switching process of slowly switching the noise use rate or the error use rate as in this example is not performed but the dither process and the error diffusion process are switched. In this way, when the dither process and the error diffusion process are simply switched without performing an appropriate switching process, the problem such as the generation of a boundary line is caused due to the switching.

FIG. 10(d) shows an example of the printing result according to this example. As can be seen from the drawing, according to this example, it is possible to appropriately suppress the dot delay in the highlighted part or the shadowed part. It is also possible to appropriately prevent the generation of texture in the halftone part or the generation of a boundary line due to the switching. Accordingly, according to this example, it is possible to more appropriately perform the quantization process.

While the invention has been described with reference to the embodiment, the technical scope of the invention is not limited to the range of the embodiment. It will be apparent to those skilled in the art that the embodiment maybe modified or improved in various forms. It can be clearly seen from the appended claims that the modifications or improvements are included in the technical scope of the invention.

The quantization process is described above on the assumption that the number of gradations after the quantization is two. However, the same quantization process can be applied to, for example, a case where the number of gradations is three or more. The case where the number of gradations is three or more means, for example, a case where three or more types of dot sizes are used.

In this case, for example, the quantization processes corresponding to the dot sizes are performed using both the dither matrix noise and the accumulated error depending on the noise use rate and the error use rate, identically or similarly to the case of two gradations. The output results corresponding to the dots of various sizes are compared and the dot of which the size is the largest is used as the final output. Accordingly, it is possible to more appropriately perform the quantization process, for example, even when the number of gradations is three or more.

Industrial Applicability

The invention can be suitably used, for example, in a program causing a computer to perform quantization.

Description of Reference Numerals and Signs

10: PRINTING SYSTEM
12: IMAGE PROCESSING APPARATUS
14: PRINTING MACHINE

The invention claimed is:

1. A non-transitory computer-readable medium stored with a program causing a computer to quantize a gray level indicating the depth of color of each pixel in an image, the quantization comprising:
a pixel selecting process of sequentially selecting pixels to be quantized;
a use rate determining process of determining a noise use rate indicating the degree to which a dither matrix noise which is noise designated by a predetermined dither matrix has an influence on the quantization and an error use rate indicating the degree to which an accumulated error obtained by accumulating a quantization error which is an error generated in the quantization on peripheral pixels has an influence on the quantization, in which the noise use rate and the error use rate corresponding to the corresponding pixel are determined depending on the gray levels of the pixels sequentially selected through the pixel selecting process; and
a quantization executing process of performing the quantization on the gray levels of the pixels sequentially selected through the pixel selecting process, in which the quantization is performed using the dither matrix noise based on the noise use rate corresponding to the corresponding pixel and using the accumulated error based on the error use rate corresponding to the corresponding pixel.

2. The non-transitory computer-readable medium according to claim 1, wherein the program causing the computer to additionally perform on the pixels sequentially selected through the pixel selecting process:
an error-corrected input value calculating process of calculating an error-corrected input value which is a gray level having been corrected on the basis of the accumulated error, in which a value obtained by adding the product of the error use rate and the accumulated error corresponding to the corresponding pixel to the gray level of the corresponding pixel is calculated as the error-corrected input value; and
a noise-corrected threshold value calculating process of calculating a noise-corrected threshold value which is a threshold value having been corrected on the basis of the dither matrix noise as a threshold value used for the quantization, in which a value obtained by adding the product of the noise use rate and the dither matrix noise corresponding to the corresponding pixel to a predetermined initial threshold value is calculated as the noise-corrected threshold value,
wherein the quantization executing process performs the quantization by comparing the noise-corrected threshold value and the error-corrected input value with each other.

3. The non-transitory computer-readable medium according to claim 1, wherein the quantization executing process includes:
a maximum value determining process of determining whether the gray level of the pixel which is the input value of the quantization is equal to the maximum value of an allowable gray level range;
a minimum value determining process of determining whether the gray level of the pixel which is the input value is equal to the minimum value of the allowable gray level range; and
a quantization value acquiring process of acquiring a quantization value as the result of the quantization,
wherein when it is determined in the maximum value determining process that the input value is equal to the maximum value, the quantization value acquiring process acquires a value to be output when the gray level is larger than the threshold value as the quantization value, and
wherein when it is determined in the minimum value determining process that the input value is equal to the minimum value, the quantization value acquiring process acquires a value to be output when the gray level is smaller than the threshold value as the quantization value.

4. The non-transitory computer-readable medium according to claim 1, wherein in determining the noise use rate and the error use rate, the use rate determining process sets the noise use rate when the gray level of the pixel is a gray level corresponding to one of a highlighted part and a shadowed part to a value larger than the noise use rate when the gray level of the pixel is a gray level corresponding to a halftone part of which the gray level is between the gray levels of the highlighted part and the shadowed part, and sets the error use rate when the gray level of the pixel is a gray level corresponding to one of the highlighted part and the shadowed part to a value smaller than the error use rate when the gray level of the pixel is the gray level corresponding to the halftone part.

5. The non-transitory computer-readable medium according to claim 4, wherein the use rate determining process sets the noise use rate to a value equal to or larger than the lowest noise use rate set to a value larger than 0 in advance even when the gray level of the pixel has any value.

6. The non-transitory computer-readable medium according to claim 5, wherein the use rate determining process
uses a first highlight reference value set in advance and a second highlight reference value larger than the first highlight reference value as a reference indicating the gray level range of the highlighted part;
uses a first shadow reference value set in advance and a second shadow reference value larger than the first shadow reference value as a reference indicating the gray level range of the shadowed part;
uses a first halftone reference value which is larger than the second highlight reference value and smaller than the first shadow reference value and a second halftone reference value which is larger than the first halftone reference value and smaller than the first shadow reference value as a reference indicating the gray level range at the center of the halftone part;

sets the noise use rate to 1 when the gray level of the pixel is equal to or less than the first highlight reference value or when the gray level of the pixel is equal to or more than the second shadow reference value;

sets the noise use rate to the lowest noise use rate when the gray level of the pixel is equal to or more than the first halftone reference value and equal to or less than the second halftone reference value;

sets the noise use rate to a value which is equal to or more than the lowest noise use rate and equal to or less than 1 and which gradually decreases from 1 depending on the difference between the gray level of the pixel and the first highlight reference value when the gray level of the pixel is equal to or more than the first highlight reference value and equal to or less than the first halftone reference value;

sets the noise use rate to a value which is equal to or more than the lowest noise use rate and equal to or less than 1 and which gradually increases from the lowest noise use rate depending on the difference between the gray level of the pixel and the second halftone reference value when the gray level of the pixel is equal to or more than the second halftone reference value and equal to or less than the second shadow reference value;

sets the error use rate to 1 when the gray level of the pixel is equal to or more than the second highlight reference value and equal to or less than the first shadow reference value;

sets the error use rate to a value which is equal to or more than 0 and equal to or less than 1 and which gradually decreases from 1 depending on the difference between the second highlight reference value and the gray level when the gray level of the pixel is equal to or less than the second highlight reference value; and sets the error use rate to a value which is equal to or more than 0 and equal to or less than 1 and which gradually decreases from 1 depending on the difference between the gray level of the pixel and the first shadow reference value when the gray level of the pixel is equal to or more than the first shadow reference value.

7. The non-transitory computer-readable medium according to claim 6, wherein the use rate determining process additionally uses a third highlight reference value which is larger than 0 and equal to or less than the first highlight reference value as the reference indicating the gray level range of the highlighted part;

additionally uses a third shadow reference value which is equal to or more than the second shadow reference value and smaller than the maximum value of the allowable gray level range as the reference indicating the gray level range of the shadowed part;

sets the error use rate to 0 when the gray level of the pixel is equal to or less than the third highlight reference value;

sets the error use rate to a value obtained by dividing the difference between the gray level of the pixel and the third highlight reference value by the difference between the second highlight reference value and the third highlight reference value when the gray level of the pixel is equal to or more than the third highlight reference value and equal to or less than the second highlight reference value;

sets the error use rate to a value obtained by dividing the difference between the third shadow reference value and the gray level of the pixel by the difference between the third shadow reference value and the first shadow reference value when the gray level of the pixel is equal to or more than the first shadow reference value and equal to or less than the third shadow reference value; and sets the error use rate to 0 when the gray level of the pixel is equal to or more than the third shadow reference value.

8. An image processing apparatus quantizing a gray level indicating the depth of color of each pixel in an image, comprising:

a pixel selecting unit that sequentially selects pixels to be quantized;

a use rate determining unit that determines a noise use rate indicating the degree to which a dither matrix noise which is noise designated by a predetermined dither matrix has an influence on the quantization and an error use rate indicating the degree to which an accumulated error obtained by accumulating a quantization error which is an error generated in the quantization on peripheral pixels has an influence on the quantization and that determines the noise use rate and the error use rate corresponding to the corresponding pixel depending on the gray levels of the pixels sequentially selected by the pixel selecting unit; and a quantization executing unit that performs the quantization on the gray levels of the pixels sequentially selected by the pixel selecting unit and that performs the quantization using the dither matrix noise based on the noise use rate corresponding to the corresponding pixel and using the accumulated error based on the error use rate corresponding to the corresponding pixel.

9. An image processing method of quantizing a gray level indicating the depth of color of each pixel in an image, comprising:

a pixel selecting step of sequentially selecting pixels to be quantized;

a use rate determining step of determining a noise use rate indicating the degree to which a dither matrix noise which is noise designated by a predetermined dither matrix has an influence on the quantization and an error use rate indicating the degree to which an accumulated error obtained by accumulating a quantization error which is an error generated in the quantization on peripheral pixels has an influence on the quantization and determining the noise use rate and the error use rate corresponding to the corresponding pixel depending on the gray levels of the pixels sequentially selected in the pixel selecting step; and a quantization executing step of performing the quantization on the gray levels of the pixels sequentially selected in the pixel selecting step and performing the quantization using the dither matrix noise based on the noise use rate corresponding to the corresponding pixel and using the accumulated error based on the error use rate corresponding to the corresponding pixel.

* * * * *